United States Patent
Storey

(10) Patent No.: US 7,265,285 B2
(45) Date of Patent: Sep. 4, 2007

(54) PLECTRUM WITH GRIP AND METHOD OF MANUFACTURE

(76) Inventor: David Charles Storey, 11521 Snowheights Blvd. NE., Albuquerque, NM (US) 87112

(*) Notice: Subject to any disclaimer, the term of this patent is extended or adjusted under 35 U.S.C. 154(b) by 0 days.

(21) Appl. No.: 11/365,026

(22) Filed: Mar. 1, 2006

(65) Prior Publication Data

US 2006/0196340 A1  Sep. 7, 2006

Related U.S. Application Data

(60) Provisional application No. 60/658,812, filed on Mar. 4, 2005.

(51) Int. Cl.
*G10D 3/16* (2006.01)
(52) U.S. Cl. .......................... 84/322; 84/320
(58) Field of Classification Search ................. 84/322
See application file for complete search history.

(56) References Cited

U.S. PATENT DOCUMENTS

| | | | | |
|---|---|---|---|---|
| 655,959 A * | 8/1900 | Cochrane | ..................... | 84/322 |
| 998,440 A * | 7/1911 | Willat | ........................ | 84/322 |
| 1,117,056 A * | 11/1914 | Knackstedt | ................... | 84/322 |
| 1,254,577 A * | 1/1918 | Carpenter et al. | ............. | 84/322 |
| 1,461,070 A * | 7/1923 | Rudesyle | ..................... | 84/322 |
| 4,150,601 A * | 4/1979 | Henley, Jr. | ................... | 84/322 |
| D290,467 S * | 6/1987 | Hyduck | ....................... | D17/20 |
| 4,691,609 A * | 9/1987 | Acocella | ...................... | 84/322 |
| D292,413 S * | 10/1987 | Slusser | ........................ | D17/20 |
| 4,711,150 A * | 12/1987 | Hyduck | ....................... | 84/322 |
| 4,993,302 A * | 2/1991 | Jonathan | ..................... | 84/322 |
| D330,905 S * | 11/1992 | Thomas | ....................... | D17/20 |
| 5,271,308 A | 12/1993 | Balog | | |
| 5,610,349 A * | 3/1997 | Fogarty et al. | ............... | 84/322 |
| 5,648,622 A * | 7/1997 | Storey | ......................... | 84/322 |
| 5,859,377 A * | 1/1999 | Mackey et al. | ............... | 84/322 |
| 5,942,704 A * | 8/1999 | Weldon | ....................... | 84/320 |
| 6,245,977 B1 * | 6/2001 | Byrns | .......................... | 84/322 |
| 6,346,662 B1 * | 2/2002 | Sielaff | ......................... | 84/322 |
| 6,417,431 B1 * | 7/2002 | Wilkinson | ................... | 84/322 |
| 6,815,597 B1 | 11/2004 | Bosley | | |
| 6,817,217 B2 * | 11/2004 | McGuire et al. | .............. | 70/408 |
| 6,835,881 B1 | 12/2004 | Jackson | | |
| 6,948,344 B2 * | 9/2005 | Janssen | ..................... | 70/278.3 |
| 7,067,729 B2 * | 6/2006 | Leong | .......................... | 84/322 |
| 2002/0043148 A1 * | 4/2002 | Wilkinson | ................... | 84/322 |
| 2002/0108483 A1 * | 8/2002 | Smith | .......................... | 84/322 |
| 2006/0196340 A1 * | 9/2006 | Storey | ......................... | 84/320 |
| 2007/0079685 A1 * | 4/2007 | Mizek | .......................... | 84/322 |

* cited by examiner

*Primary Examiner*—Lincoln Donovan
*Assistant Examiner*—Robert W. Horn
(74) *Attorney, Agent, or Firm*—Kevin Lynn Wildenstein

(57) ABSTRACT

This invention relates to an apparatus, device or method for manufacturing a grip plectrum or pick formed from a first material (such as, for example, plastic or like material), the plectrum having in one embodiment a generally triangular shaped body with a broad top portion, an intermediate portion, and a narrow bottom portion, with the top and intermediate portion being substantially covered with a second material that has a greater degree of grip than the first material. The plectrum has a generally triangular (and preferably tear-drop) shaped body being made from a first material. A top and intermediate portion of the plectrum are substantially or completely covered by a second material on all four sides (front surface, back surface and both side surfaces) and is adapted to be gripped by the user between the thumb and index finger, with a bottom portion being used to pluck the instrument strings. In one embodiment, the second material is preferably a non-slip material such as rubber or the like.

20 Claims, 1 Drawing Sheet

PLECTRUM WITH GRIP AND METHOD OF MANUFACTURE

CLAIM OF PRIORITY

The present invention claims priority based upon U.S. Provisional Patent Application No. 60/658,812, filed Mar. 4, 2005, which is hereby incorporated by reference.

FIELD OF INVENTION

The present invention relates to generally to plectrums or "picks" which are used to play or strum a stringed instrument, such as a guitar or mandolins of the lute family. The present invention is generally held between a person's thumb and index finger of one hand, and is used to pluck or collectively strum the strings of the instrument. It is desirable that the present invention have has a non-slip or gripped portion which is adapted to be held between the thumb and fingers of the player and, according to the present invention, the non-slip area encompasses all four sides of the holding portion in order to maximize grip as the plectrum is rotated, curled, adjusted or otherwise moved in the player's hand while in use. Further, in another embodiment of the present invention, a manufacturing method is disclosed for the production of the present invention in high quantities.

BACKGROUND OF THE INVENTION

Plectrums (or, "picks" as they are commonly known) are known devices which help a user "pick" or strum a stringed instruments of the lute family such as a guitar, banjo or mandolin. A problem often arises when either the user accidentally mis-positions the pick in relation to the stringed instrument (which may occur, for example, by the user's lack of clamping strength between the user's thumb and index finger, or due to perspiration while playing), or when the user drops the plectrum.

Various attempts have been made in the past to provide plectrums which allow the player some degree of gripping means to prevent slippage while in use. For example, U.S. Pat. No. 4,993,302 to Jonathan discloses a pick with two opposing rubber pieces glued onto the pick's sides. Similarly, U.S. Pat. No. 5,271,308 to Balog discloses a felt material being glued to the pick's sides, with felt being used to prevent slippage due to a finger's perspiration. U.S. Pat. No. 6,346,662 to Sielaff discloses gel-filled pads added to a plectrum to obtain better grip. However, the problem with this type of disclosure is that it is known in the art that gluing or attaching non-slip pads to one plectrum at a time is an inefficient way to produce the high quantities needed to supply the plectrum industry. Other prior art does not rely on any type of secondary material added to the first material used to form the pick, but rather, relies on the material which is used to form the plectrum. Such a disclosure is shown, for example, in U.S. Pat. No. 5,610,349 to Fogarty et al., which discloses raised portions of a plectrum's surface that are molded as part of the same plectrum material.

The present invention has been developed in order to overcome these and other drawbacks of the prior art devices by providing a single plectrum having at least a second material coating that encompasses all four sides of the gripped portion of the plectrum and a quick and efficient way to mass produce such plectrums in high quantities.

Accordingly, it is one object of the present invention to disclose a musical instrument grip plectrum formed from a first material, the plectrum, when viewed from the top plan view, has a generally triangular shaped body with a broad top portion, an intermediate portion, and a narrow bottom portion, with the top and intermediate portion being substantially covered with a second material that has a greater degree of grip than the first material. In one embodiment, this first material is preferably varied in composition to produce different degrees of flexibility.

It is a further object of the present invention to disclose a manufacturing method to cover the first material with a second material. As such, in one preferred embodiment, the first material is disclosed to have protrusions of varying shape (such as, for example, circular or rectangular). The first material may further be adapted to receive a manufacturer's logo and may also contain through openings. The protrusions extending from the top and intermediate portions are adapted to maintain centralization of the top and intermediate portions in a manufacturing mold while the second material is being applied.

In an alternate embodiment of the manufacturing method, the manufacturing mold is adapted to have protrusions extending from it which centralizes the first material which is generally flat in shape at the top and intermediate portion. The protrusions in the manufacturer's mold may be of varying shape (for example, either circular or rectangular) and may also include the manufacturer's logo.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

This invention relates to an apparatus, or method for manufacturing a grip plectrum formed from a first material, the plectrum having a generally triangular shaped body with a broad top portion, an intermediate portion, and a narrow bottom portion, with the top and intermediate portion being substantially covered with a second material that has a greater degree of grip than the first material.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

Figure 1:
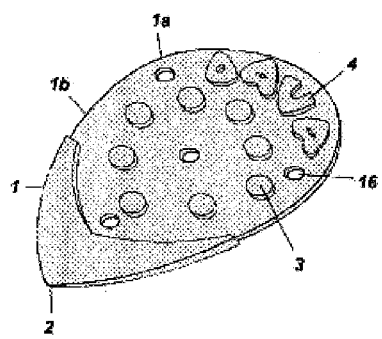
FIG. 1 illustrates a side perspective view of one embodiment of the present invention, the plectrum being formed from a first material, the figure further illustrating one or more openings or through holes and one or more protrusions placed in pre-determined locations in a top portion and an intermediate portion of the present invention.
Figure 2:
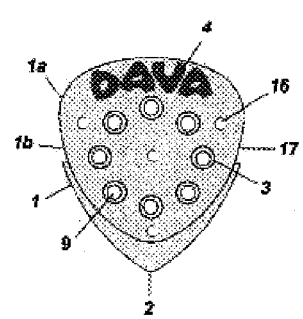
FIG. 2 is a front plan view of another embodiment of the present invention, illustrating that in one embodiment, the present invention's protrusions may be adapted to contain partial or complete protrusion openings or protrusion through holes.
Figure 3:
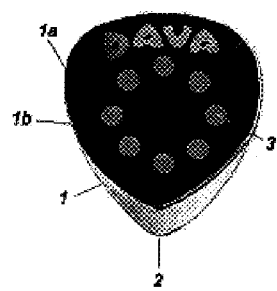
FIG. 3 is a front plan view illustrating the present invention as a contemplated finished device after a second material is applied to the first material.

As seen in FIGS. 1-3, the present invention is a plectrum of generally planar body and triangular circumference, and generally having a broader top portion 1a, an intermediate portion 1b and a narrower bottom portion 2. The present invention 1 is adapted to be gripped by a user between the user's thumb and index finger, as the user plays a stringed musical instrument such as a guitar, banjo, mandolin, lute or similar stringed instrument. As such, in the embodiment shown in FIGS. 1 and 4, the bottom portion 2 has a width greater than the width of the top portion 1a and intermediate portion 1b. Additionally, the top portion 1a and the intermediate portion 1b both are disclosed to have an upper intermediate surface on at least one side of plectrum 1, wherein this structure on one side of plectrum 1 mirrors the opposite side of the plectrum 1.

As shown in FIGS. 1, 2, and 3 the pick has a generally triangular (and preferably tear-drop) configuration including a broader top portion 1a, an intermediate portion 1b, and a narrow bottom portion 2. While this embodiment is disclosed, those of skill in the art will realize that the present invention may be formed as other shapes or sizes desired by a user, but still remain within the spirit and the scope of the present invention. In one embodiment, intermediate portion 1b may be formed to have one or more protrusions 3, through holes 16 and may also include one or more aesthetic designations 4 (such as, for example, a manufacturer's logo or a band name).

Figure 4:
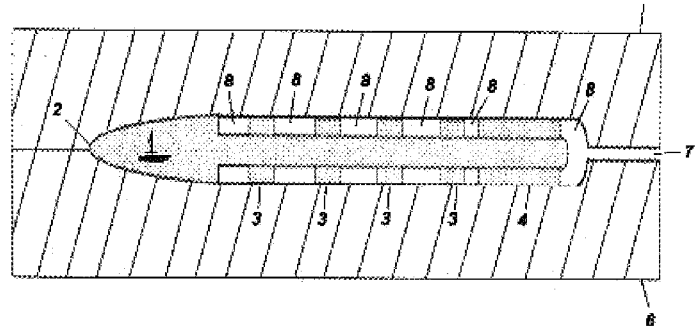
FIG. 4 is a cross-section view of the placement of the present invention as it may reside in a representative manufacturing mold.

During the formation process of the present invention as illustrated in FIG. 4, plectrum 1 formed of a first material A is placed in a mold 6 having a mold opening 7, the plectrum 1 being positioned so that the bottom portion 2, each protrusion 3, and the manufacturer's log 4 are pressed tight against mold 6. A representative first material may include plastic or like material. When mold 6 closes on the plectrum 1, a second material B is injected into the mold 6 under high pressure, so that when a second material is injected into mold opening 7, the second material flows around protrusions 3 (and logo 4, if included on the plectrum 1), through openings 16, the second material B filling each hollow cavity portion 8 on both sides of plectrum 1. In the preferred embodiment, the second material B encapsulates the top portion 1a and intermediate portion 1b and flows around a side section 17.

In order to prevent the top portion 1a and intermediate portion 1b from flexing or moving to one side of the mold 6 relative to each other, it may be necessary to maintain centralization of the top 1a and intermediate portion 1b relative to each other during the high pressure injection process. As seen in FIG. 3 for example, the top and intermediate portion surfaces 1a, 1b are covered substantially by the second material B except for the plurality of protrusions 3, logo 4, and bottom portion 2, so that the surface of second material B is substantially planar with the surface of bottom portion 2. In one embodiment, the second material B is preferably a viscous material when heated, but when cooled, it provides a planar surface which is substantially parallel to the surface of the first material, and further, the second material will retain a flexible yet grippable characteristic. Finally, those of skill in the art will realize that protrusions 3 are not limited to being round and may be rectangular or any shape desired by a user, and may include through openings 9.

Figure 5:
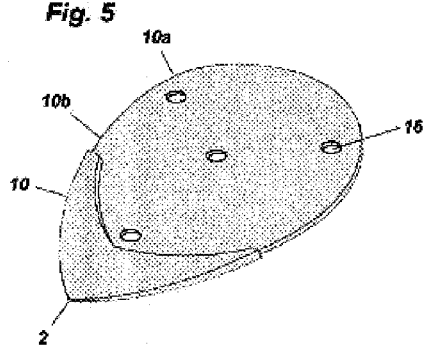
FIG. 5 is a side perspective view of another embodiment of the present invention, the plectrum being made from a first material, this embodiment illustrating one or more openings or through holes, and further illustrating the lack of protrusions in a top portion and an intermediate portion of the present invention.
Figure 6:
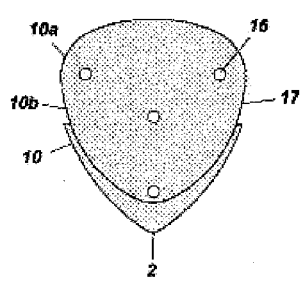
FIG. 6 is a front plan view of the embodiment illustrated in FIG. 5.

In another preferred embodiment shown in FIG. 5 and FIG. 6, a plectrum 1 formed of a first material A is disclosed having a top portion 10a and an intermediate portion 10b without protrusions. In this embodiment, the mold 13 (as seen in FIG. 8) may include one or more protrusions 15 in order to maintain centralization of the top and intermediate portions 10a and 10b relative to each other.

Figure 7:
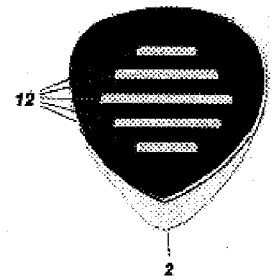
FIG. 7 is a front plan view of another embodiment of the present invention, illustrating representative rectangular indents left by the protrusion in the manufacturer's mold.

Again, as seen in FIG. 7 for example, the top and intermediate portion surfaces 10a, 10b of this embodiment are covered substantially by the second material B, so that the surface of second material B is substantially planar with the surface of bottom portion 2. In one embodiment, the second material B is preferably a viscous material when heated, but when cooled, it provides a planar surface which is substantially parallel to the surface of the first material, and further, the second material will retain a flexible yet grippable characteristic. Finally, those of skill in the art will realize that this embodiment may include through openings 16.

Figure 8:
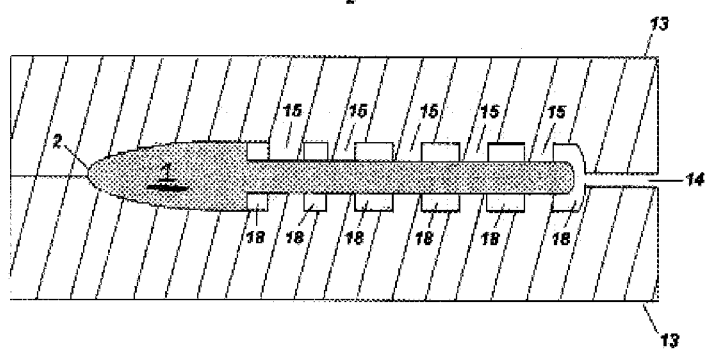
FIG. 8 shows another cross-section view of the placement of the present invention as it may reside in a representative manufacturing mold, here, illustrating another method of maintaining centralization of the first material used to form the present invention in the manufacturer's mold.

FIG. 8 illustrates another manufacturing method for producing one or more embodiments of the present invention. As seen in FIG. 8, when the second material B is injected into opening 14 of mold 13, the second material B should be adapted to flow around the protrusions 15, through openings 16 and around side section 17 (as seen in FIG. 6) to substantially or completely fill each hollow cavity 18 (i.e., which is defined by the planar space between each protrusion) on both sides of the plectrum 1 to form a covering around the top and sides of intermediate portions 10a and 10b. Shown in FIG. 7, the portions 10a and 10b are covered by the second material B except for the bottom of portion 10b where the protrusions 15 in the mold 13 have left uncovered sections 12. The uncovered sections 12 could be round, rectangular, or any shape desired by the user.

While the scope of the present invention should not be limited to any particular theory of operation, it should be instructive to speculate on such in order to provide the reader with a full understanding of this invention and its preferred embodiment. Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention.

Other variations and modifications of the present invention will be apparent to those of ordinary skill in the art, and is not limited except by the appended claims. The particular values and configurations discussed above can be varied, and are cited to illustrate particular embodiments of the present invention. It is contemplated that the use of the present invention can involve components having different characteristics as long as the principles disclosed herein are followed.

The invention claimed is:

1. A method for manufacturing a device for playing stringed instruments, the method comprising the steps of:
providing a plectrum formed of a first material and having a top portion, an intermediate portion and a bottom portion, the bottom portion being of greater width than the top portion and the intermediate portion, the top portion and the intermediate portion both having an upper intermediate surface;
introducing the plectrum into a high injection mold having a mold opening; and
injecting a second material into the mold opening, the second material substantially encapsulating the top portion and the intermediate portion within the mold so that the second material provides a surface which is substantially parallel to the upper intermediate surface and which is substantially planar with a surface of the bottom portion.

2. The product produced by the method according to claim 1.

3. The method of claim 1, the plectrum further comprising one or more one or more protrusions and through holes formed through the upper intermediate surface, wherein a substantially planar space between each protrusion defines a hollow cavity.

4. The method of claim 3, wherein the step of injecting a second material into the mold opening further includes the step of injecting the second material through and filling each hollow cavity.

5. The product produced by the method according to claim 4.

6. A method for manufacturing a device for playing stringed instruments, the method comprising the steps of:
providing a plectrum formed of a first material and having a top portion, an intermediate portion and a bottom portion, the bottom portion being of greater width than the top portion and the intermediate portion, the top portion and the intermediate portion both having an upper intermediate surface, the plectrum further comprising one or more one or more protrusions and through holes formed through the upper intermediate surface, wherein a substantially planar space between each protrusion defines a hollow cavity;
introducing the plectrum into a high injection mold having a mold opening; and
injecting a second material into the mold opening to thereby fill each hollow cavity, the second material substantially encapsulating the top portion and the intermediate portion within the mold so that the second material provides a surface which is substantially parallel to the upper intermediate surface and which is substantially planar with a surface of the bottom portion.

7. The product produced by the method according to claim 6.

8. The method of claim 6, the plectrum further comprising one or more one or more aesthetic designations thereon.

9. The product produced by the method according to claim 8.

10. The method of claim 6, wherein the second material is a viscous material when heated, but when cooled, the second material provides a planar surface which is substantially parallel to any surface of the first material, while retaining a flexible and grippable characteristic.

11. The product produced by the method according to claim 10.

12. A method for manufacturing a device for playing a stringed instrument, the method comprising the steps of:
providing a plectrum formed of a first material and having a broad top portion, an intermediate portion and a narrow bottom portion, the bottom portion being of greater width than the top portion and the intermediate portion, the top portion and the intermediate portion both having an upper intermediate surface, the plectrum further comprising one or more one or more protrusions and through holes formed through the upper intermediate surface, a substantially planar space between each protrusion defining a hollow cavity, the plectrum further comprising one or more one or more aesthetic designations thereon;
introducing the plectrum into a high injection mold having a mold opening; and
injecting a second material into the mold opening to thereby fill each hollow cavity, the second material substantially encapsulating the top portion and the intermediate portion within the mold so that the second material provides a surface which is substantially parallel to the upper intermediate surface and which is substantially planar with a surface of the bottom portion.

13. The product produced by the method according to claim 12.

14. The method of claim 12, wherein the second material is a viscous material when heated, but when cooled, the second material provides a planar surface which is substantially parallel to any surface of the first material, while retaining a flexible and grippable characteristic.

15. The method of claim 14 wherein the second material is rubber.

16. The product produced by the method according to claim 15.

17. The method of claim 15 wherein the first material is plastic.

18. The product produced by the method according to claim 17.

19. The method of claim 14 wherein the first material is plastic.

20. The product produced by the method according to claim 19.

* * * * *